United States Patent
Fukumine et al.

(10) Patent No.: US 8,119,289 B2
(45) Date of Patent: Feb. 21, 2012

(54) ELECTRO-CHEMICAL ELEMENT ELECTRODE

(75) Inventors: Yoshio Fukumine, Tokyo (JP); Mayumi Fukumine, Tokyo (JP); Fumiaki Tsuchiya, Tokyo (JP)

(73) Assignee: Zeon Corporation, Tokyo (JP)

(*) Notice: Subject to any disclaimer, the term of this patent is extended or adjusted under 35 U.S.C. 154(b) by 1001 days.

(21) Appl. No.: 11/919,482

(22) PCT Filed: Apr. 28, 2006

(86) PCT No.: PCT/JP2006/308954
§ 371 (c)(1),
(2), (4) Date: Feb. 29, 2008

(87) PCT Pub. No.: WO2006/118235
PCT Pub. Date: Nov. 9, 2006

(65) Prior Publication Data
US 2009/0316334 A1   Dec. 24, 2009

(30) Foreign Application Priority Data
Apr. 28, 2005 (JP) .................................. 2005-132525

(51) Int. Cl.
*H01M 4/13* (2010.01)
(52) U.S. Cl. ........................................ 429/232; 429/217
(58) Field of Classification Search ........... 429/209–246
See application file for complete search history.

(56) References Cited

U.S. PATENT DOCUMENTS

| | | | |
|---|---|---|---|
| 5,567,539 A * | 10/1996 | Takahashi et al. | 429/57 |
| 5,905,004 A * | 5/1999 | Sakai et al. | 429/232 |
| 2003/0003360 A1* | 1/2003 | Gorkovenko et al. | 429/213 |
| 2005/0058907 A1* | 3/2005 | Kurihara et al. | 429/232 |
| 2005/0064069 A1 | 3/2005 | Adams | |
| 2005/0064289 A1 | 3/2005 | Suzuki et al. | |
| 2005/0116375 A1 | 6/2005 | Ito | |
| 2006/0153972 A1 | 7/2006 | Hirokawa | |

FOREIGN PATENT DOCUMENTS

| | | |
|---|---|---|
| JP | 09-289142 A | 11/1997 |
| JP | 2000-040504 A | 2/2000 |
| JP | 2003-224039 A | 8/2003 |
| JP | 2005-026191 A | 1/2005 |
| JP | 2005-078943 A | 3/2005 |
| WO | WO-2004/064092 A1 | 7/2004 |
| WO | WO-2004/077467 A1 | 9/2004 |

\* cited by examiner

*Primary Examiner* — Patrick Ryan
*Assistant Examiner* — Muhammad Siddiquee
(74) *Attorney, Agent, or Firm* — Birch, Stewart, Kolasch & Birch, LLP

(57) ABSTRACT

An electrochemical element electrode for obtaining electrochemical elements having both low internal resistance and high capacitance, and a secondary battery and an electric double layer capacitor using the electrode are provided.

An electrochemical element electrode which is made by forming an active material layer on a collector, and the active material layer is formed by press-molding composite particles with high strength at moderate pressure not to crush the composite particles under pressure, while the structures of the composite particles being maintained, to bond the composite particles together, wherein the composite particles comprise an electrode active material, an electric conductive material, a dispersible binder and a soluble resin, in which the electrode active material and the electric conductive material are bonded by the dispersible binder. By use of this electrode, an electric double layer capacitor or a secondary battery is obtained.

13 Claims, 4 Drawing Sheets

[FIG. 1]
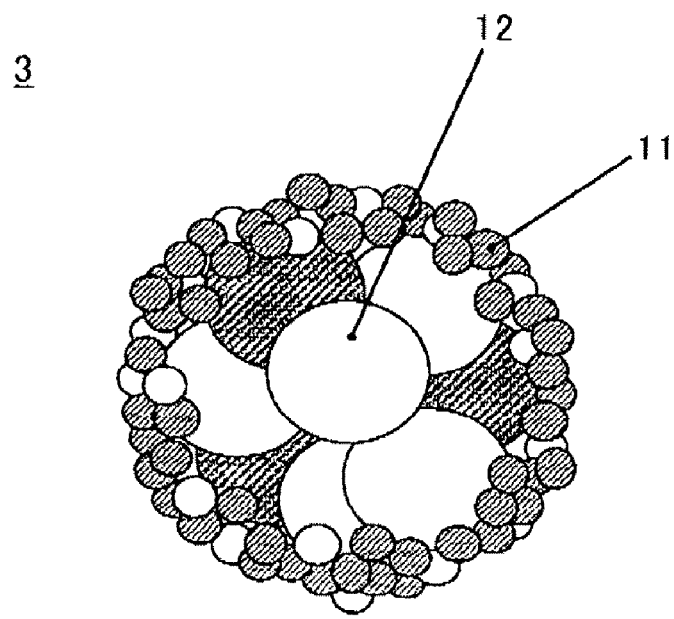
[FIG. 2]
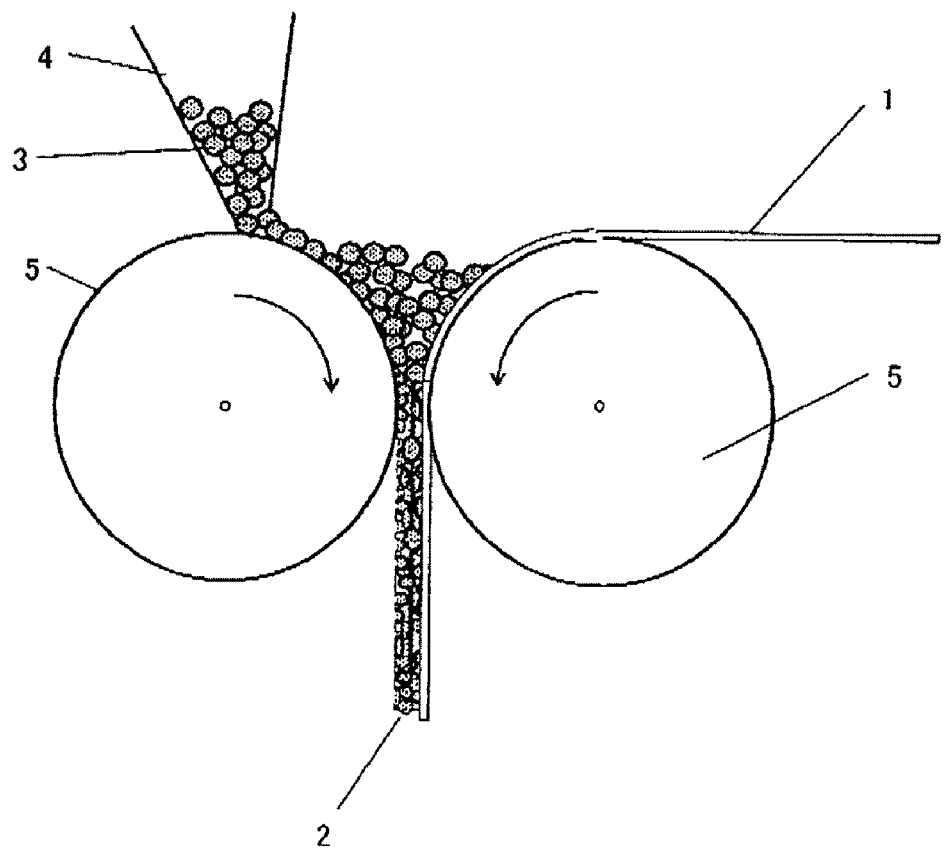
[FIG. 3]

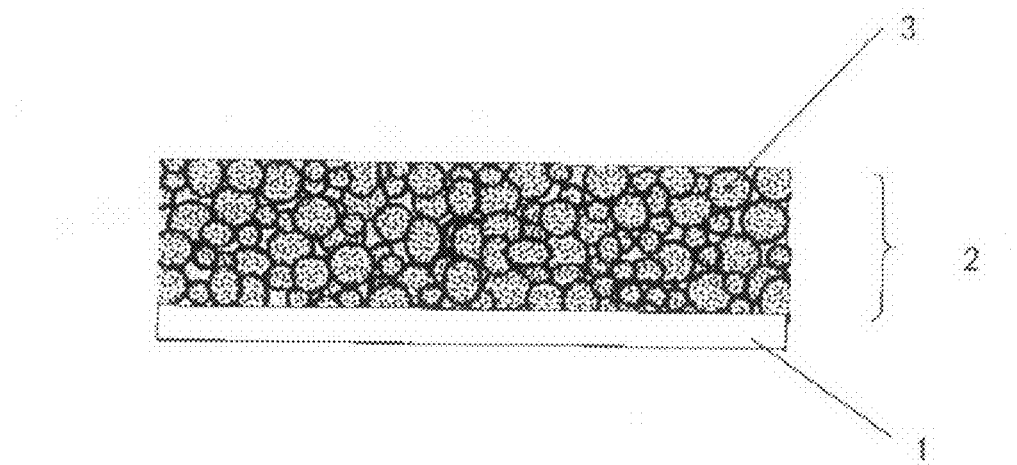
[FIG.4]
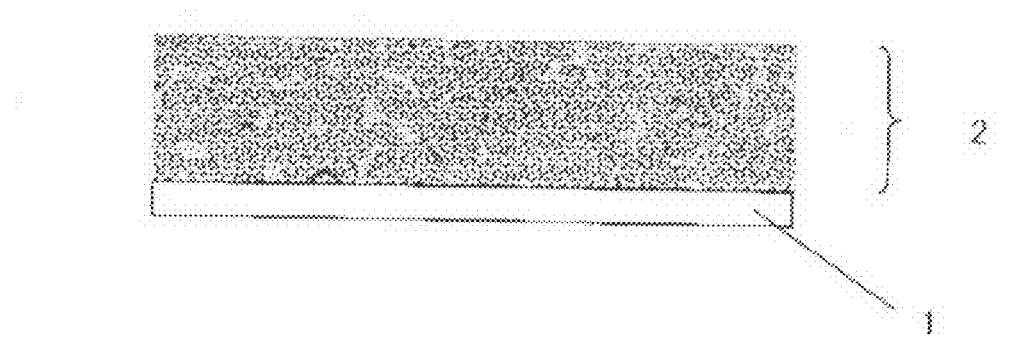
[FIG.5]
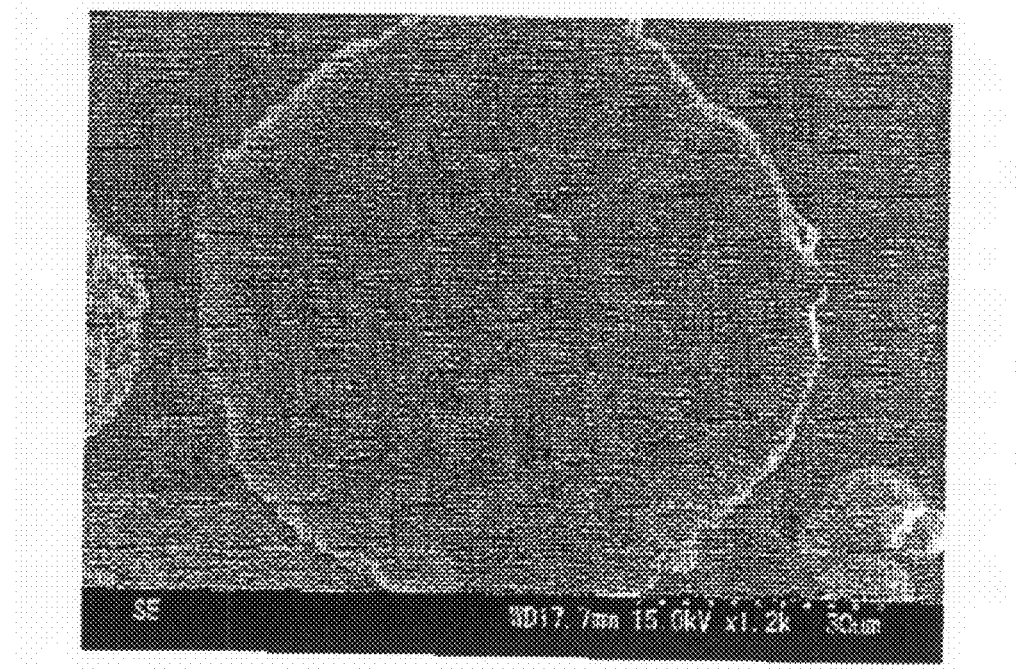
[FIG.6]

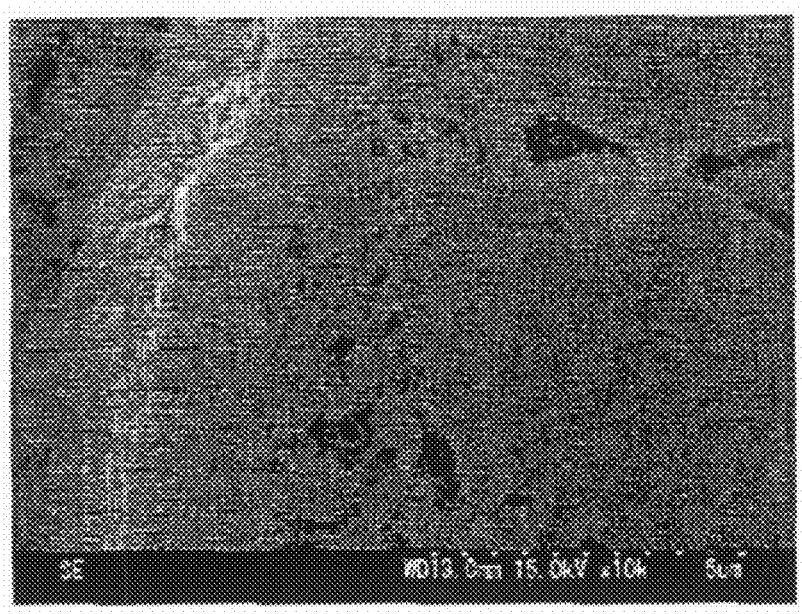
[FIG. 7]
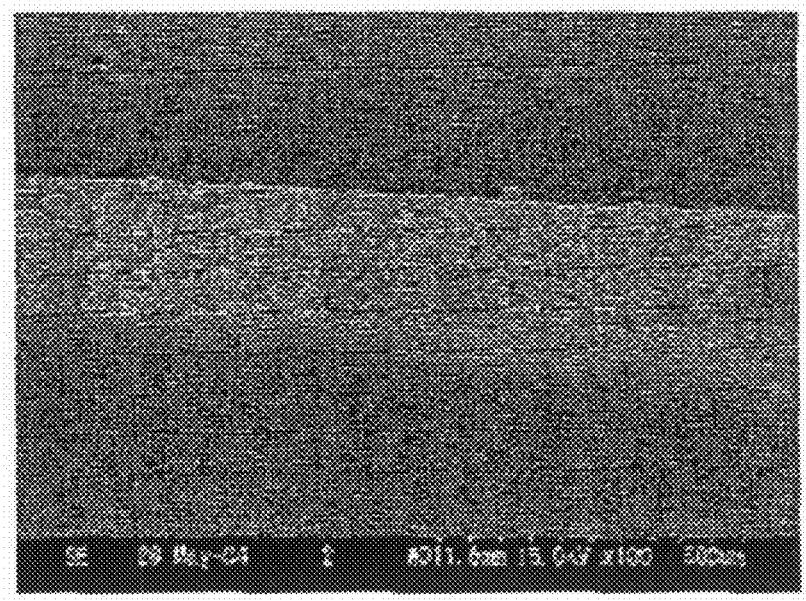
[FIG. 8]

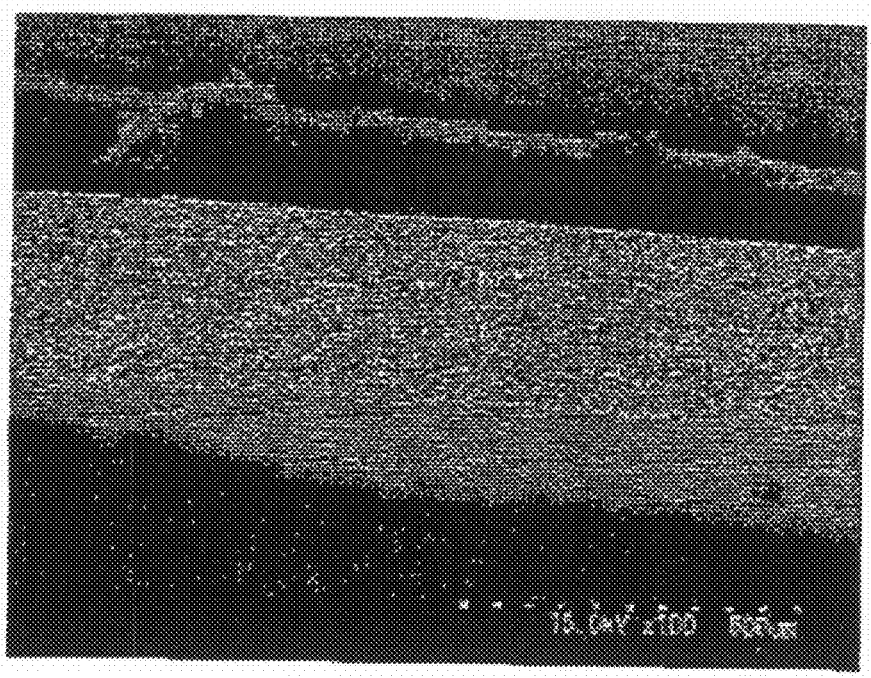
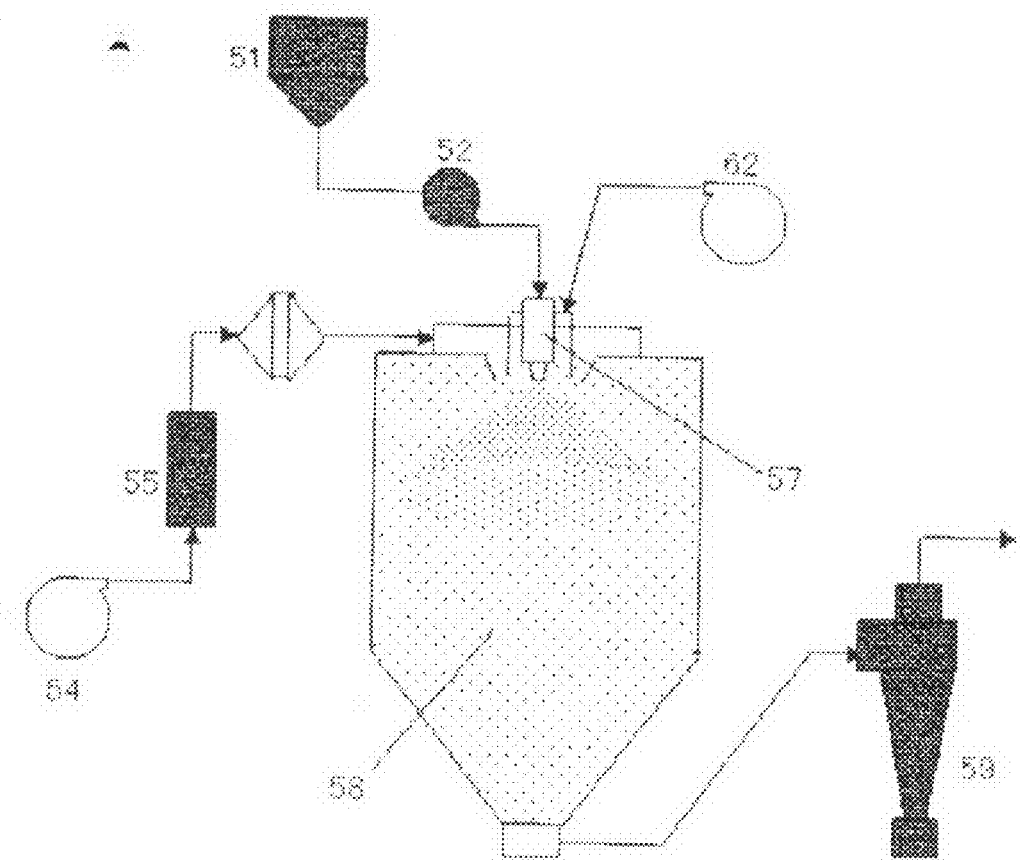
[FIG. 9]

ELECTRO-CHEMICAL ELEMENT ELECTRODE

TECHNICAL FIELD

The present invention relates to an electrochemical element electrode (in the present specification, referred to simply as "electrode") used preferably for an electrochemical elements such as a lithium ion secondary battery and an electric double layer capacitor, in particular an electric double layer capacitor, and a secondary battery and an electric double layer capacitor using the electrode.

BACKGROUND ART

Electrochemical elements such as a lithium ion secondary battery and an electric double layer capacitor have advantageous characteristics that they are small, lightweight, their energy density is high, and they can be repeatedly charged and discharged, and accordingly their demand is expanding rapidly. The lithium ion secondary battery has a relatively large energy density, and it is used in the fields such as cellular phones and notebook personal computers, meanwhile the electric double layer capacitor can be rapidly charged and discharged, and it is used as a memory backup small power source in personal computers and the like. Furthermore, the electric double layer capacitor is expected to be applied as a large sized power source for electric vehicles. Moreover, the redox capacitor using the oxidation-reduction reaction (pseudo electricity double layer capacitance) of the surface of a metal oxide or a conductive polymer also attracts attention because of the size of its capacitance. As for these electrochemical elements, along with the expansion of their applications, further more improvements are required for lower resistance, higher capacitance, more excellent mechanical properties and the like. Under such circumstances, in order to enhance the performances of electrochemical elements, various improvements are also made in the materials which form electrochemical element electrodes.

The electrochemical element electrode is, in general, made by laminating active material layer, which are formed by bonding electrode active materials such as activated carbon and lithium metal oxide and electric conductive materials, on a collector.

Patent Documents 1 and 2 disclose a method of pressing and forming composite particles obtained by bonding particulate electrode active materials and particulate electric conducting auxiliary agents with a binder, and thereby obtaining active material layer. The composite particles used in the Patent Documents 1 and 2 have the structure where particulate electrode active materials and particulate electric conducting auxiliary agents are distributed uniformly in the composite particles.

Further, Patent Documents 3 discloses a method where a slurry mixed material containing electrode active materials, thermosetting resin and solvent is formed, and this mixed material is granulated by the spray-drying method to obtain composite particles, and the composite particles are fixed on a collector by hot pressing, roll pressing, or other means to form active material layer. The particles obtained in the Patent Documents 3 are hollow particles having the husks formed with bonded particulate electrode active materials.

However, in the electrochemical element obtained by use of the electric active layer formed of these particles, the internal resistance becomes high, and accordingly, only electrochemical elements with small capacitance have been obtained.

[Patent Document 1] Japanese Unexamined Patent Application Publication No. 2005-78943
[Patent Document 2] U.S. Patent Publication No. 2005/0064069
[Patent Document 3] Japanese Unexamined Patent Application Publication No. H09-289142

DISCLOSURE OF THE INVENTION

Problems to be Solved by the Invention

The object of the present invention is to provide an electrochemical element electrode for obtaining electrochemical elements having both low internal resistance and high capacitance, and a secondary battery and an electric double layer capacitor using the electrode.

Means to Solve the Problems

The present inventors have made close examinations on the active material layer obtained by pressure forming the composite particles disclosed in the Patent Documents 1 to 3, as a result, it has been found that in such composite particles, as shown in FIG. 4 and FIG. 8, composite particles are crushed under pressure, and made back to original powdery electrode active materials and powdery electric conductive materials.

Therefore, the present inventors have made an electrochemical element electrode by, in order not to crush the composite particles under pressure, pressing composite particles having high strength at moderate pressure without crushing the composite particles, wherein the composite particles comprise an electrode active material, an electric; conductive material, a dispersible binder and soluble resin, where the electrode active material and the electric conductive material are bonded by the dispersible binder, to form an active material layer on a collector in which the active material layer has a structure wherein the composite particles are bonded mutually, while the structure of the composite particles is maintained, and applied the obtained electrode to an electrochemical element, and accordingly, the present inventors have found the electrochemical element is small in internal resistance and large in capacity. The present inventors have come to complete the present invention on the basis of the above findings.

According to the present invention, there is provided an electrochemical element electrode which is made by forming an active material layer on a collector, wherein the active material layer is made by bonding composite particles together, each of the composite particles comprises an electrode active material, an electric conductive material, a dispersible binder and a soluble resin, and in which the electrode active material and the electric conductive material are bonded by the dispersible binder.

Moreover, according to the present invention, there is provided an electric double layer capacitor or a secondary battery having the electrochemical element electrode.

EFFECTS OF THE INVENTION

In the electrochemical element electrode according to the present invention, whose active material layer has a structure which composite particles comprise an electrode active material, an electric conductive material, a dispersible binder and a soluble resin, and the electrode active material and the electric conductive material are bonded by the dispersible binder, are bonded together, while the structure thereof is substantially maintained. As a result, the network structure of the electric conductive material by the composite particles is maintained, and the electric resistance becomes low. Further, since the structure of the granulated composite particles is maintained as it is, and accordingly, a lot of fine pores are distributed in the electrode, and it has a structure where electrolyte solution permeates easily, and consequently large electric capacitance can be obtained. Further, the electrode density is high, and accordingly, the electrochemical element electrode according to the present invention may be preferably applied to an electric double layer capacitor which can perform storage and conversion of energy.

BRIEF DESCRIPTION OF THE DRAWINGS

FIG. 1 is a sectional view showing a composite particle preferably used in an electrode according to the present invention.

FIG. 2 is a figure showing a method of producing an electrode according to the present invention.

FIG. 3 is a sectional view showing an electrode according to the present invention.

FIG. 4 is a figure showing a cross sectional view of an electrode according to the prior art.

FIG. 5 is a figure showing the electron microscope observation image of the cross sectional view of a composite particle obtained in EXAMPLE 1.

FIG. 6 is an enlarged view showing the cross sectional view of the composite particle shown in FIG. 5.

FIG. 7 is a figure showing the electron microscope observation image of the cross sectional view of an electrode obtained in EXAMPLE 1.

FIG. 8 is a figure showing the electron microscope observation image of the electrode according to the prior art obtained in COMPARATIVE EXAMPLE 1.

FIG. 9 is a figure showing an instance of a spray drying apparatus used in the present preferred embodiment.

| EXPLANATION OF SYMBOLS | |
|---|---|
| 1 | Collector |
| 2 | Active material layer |
| 3 | Composite particle |
| 11 | Electric conductive material |
| 12 | Electrode active material |

BEST MODE FOR CARRYING OUT THE INVENTION

The electrochemical element electrode according to the present invention is one which is made by forming an active material layer on a collector, in which the active material layer is made by bonding composite particles together, each of the composite particles comprises an electrode active material, an electric conductive material, a dispersible binder and a soluble resin, and with the electrode active material and the electric conductive material being bonded by the dispersible binder.

The composite particle used in the present invention is one that comprises an electrode active material, an electric conductive material, a dispersible binder, and soluble resin, and that the electrode active material and the electric conductive material are bonded by the dispersible binder.

The electrode active material which makes up the composite particle is suitably chosen according to the types of electrochemical elements As the electrode active material for the positive electrode of a lithium ion secondary battery, lithium-containing compound metal oxides such as $LiCoO_2$, $LiNiO_2$, $LiMnO_2$, $LiMn_2O_4$, $LiFePO_4$, $LiFeVO_4$; transition metal sulfides such as $TiS_2$, $TiS_3$, amorphous $MoS_3$; transition metal oxides such as $Cu_2V_2O_3$, amorphous $V_2OP_2O_5$, $MoO_3$, $V_2O_5$, $V_6O_{13}$; may be exampled. Furthermore, conductive polymers such as polyacetylene and poly-p-phenylene, and the like may be mentioned.

As the electrode active material for the negative electrode of a lithium ion secondary battery, for example, carbonaceous materials such as amorphous carbon, graphite, natural graphite, meso carbon micro bead (MCMB), and pitch based carbon fiber; conductive polymers such as polyacene may be mentioned. These respective electrode active materials may be used alone or in combination of two or more kinds, according to the types of electrochemical elements. When the electrode active materials are used in combinations, two or more of electrode active materials having different average particle diameters or particle diameter distributions may be used in combination.

It is preferable that shape of the electrode active material used for the electrode of a lithium ion secondary battery is granulated into spherical particles. If shape of the particles is spherical, a high density electrode can be formed at the moment when the electrode is formed. Moreover, mixture of fine particles with weight average particle diameter of about 1 μm and comparatively large particles with weight average particle diameter from 3 μm to 8 μm, or particles having a broad particle diameter distribution from 0.5 μm to 8 μm are preferable. It is preferable that in case of use, particles with diameter of 50 μm or larger are eliminated by screening and the like. Although the tap density specified by ASTM D4164 of electrode active materials is not restricted in particular, but one of 2 g/cm³ or more is used preferably in the positive electrode, and one of 0.6 g/cm³ or more is preferably used in the negative electrode.

As the electrode active material for electric double layer capacitors, usually, a carbonaceous material is used. It is preferable that the electrode active material for electric double layer capacitors has a large specific surface area enough to form an interface of a larger area even with a same weight. In particular, it is preferable that the specific surface area is 30 m²/g or more, preferably from 500 m²/g to 5,000m²/g, further preferably from 1,000 m²/g to 3,000 m²/g. As specific examples of the carbonaceous materials, activated carbon, polyacene, carbon whisker, graphite, and the like may be mentioned, and powder or fibers of these can be used. A preferable electrode active material for electric double layer capacitors is activated carbon, and specifically, activated carbon made from phenol, rayon, acrylic, pitch, or coconut husk may be listed up. As the electrode active material for electric double layer capacitors, these respective carbonaceous materials may be used alone, or in combination of two or more kinds. When the carbonaceous materials are used in combination, two or more kinds of carbonaceous materials having different average particle diameters or particle diameter distributions may be used in combination.

Moreover, non-porosity carbon that has micro crystallite carbon similar to graphite, and the interlayer distance between layers of the micro crystallite carbon is expanded may be used as the electrode active material. Such non-porosity carbon is obtained by dry distilling graphitizable carbon with developed micro crystallite of multilayer graphite structure from 700 to 850° C., subsequently heat treating it with a caustic alkali from 800 to 900° C., and further removing residual alkali ingredient with heated steam at necessity.

As the electrode active material for electric double layer capacitors, when powder whose weight average particle diameter is from 0.1 to 100 μm, preferably from 1 to 50 μm, further preferably from 5 to 20 μm is used, it is possible to easily make thin the film of the electrode for electric double layer capacitors, and to make the electric capacity high, which is preferable.

The electric conductive material which makes up the composite particle used in the present invention is a particulate carbon material which has conductivity, and does not have fine pores which can form an electric double layer, and is to increase the conductivity of an electrochemical element electrode.

The weight average particle diameter of the electric conductive material is smaller than the weight average particle diameter of the electrode active material, and is in the range usually of 0.001 to 10 μm, preferably 0.05 to 5 μm, further preferably 0.01 to 1 μm.

When the weight average particle diameter of the electric conductive material is in this range, high conductivity may be provided for the electrochemical element electrode by a smaller use amount. In particular, conductive carbon black such as furnace black, acetylene black, and KETJEN BLACK (registered trademark of Aczo Nobel Chemicals B.V.); and graphite such as natural graphite and artificial graphite; may be employed. Also in these, conductive carbon black is preferable, and acetylene black arid furnace black are further preferable. These respective electric conductive materials may be used alone or in combination of two or more.

The amount of the electric conductive material to 100 parts by weight of the electrode active material is usually in the range of 0.1 to 50 parts by weight, preferably 0.5 to 15 parts by weight, and further preferably 1 to 10 parts by weight. By using the electrode whose electric conductive material quantity is in this range, it is possible to make the capacity of an electrochemical element high and make the internal resistance low.

The dispersible binder used in the present invention is a compound having its characteristic to be dispersible in any solvent, and to bond the electrode active material and the electric conductive material. A preferable dispersible hinder is one that is dispersible in water, and for example, high molecular compounds such as fluorine polymer, diene polymer, acrylate polymer, polyimide, polyamide, polyurethane and so on may be listed up, and further preferably, fluorine polymer, diene polymer, and acrylate polymer may be mentioned. These respective dispersible binders may be used alone or may be used in combination of two or more.

The fluorine polymer is a polymer comprising monomer unit containing a fluorine atom. The amount of the monomer unit containing fluorine in the fluorine polymer is usually 50% by weight or more. As examples of the fluorine polymer, fluororesins such as polytetrafluoroethylene, polyvinylidenefluoride may be used, and polytetrafluoroethylene is preferable.

The diene polymer is a polymer including monomer unit derived from conjugated diene such as butadiene, isoprene and so on and hydrogenated product thereof. The amount of the monomer unit derived from conjugated diene in the diene polymer is usually 40% by weight or more, preferably 50% by weight or more, and further preferably 60% by weight or more. Specifically, conjugated diene homo-polymers such as polybutadiene, polyisoprene; aromatic vinyl-conjugated diene copolymer such as styrene butadiene copolymer (SBR) which may be carboxy-modified; vinyl cyanide and conjugated diene copolymer such as acrylonitrile butadiene copolymers (NBR); hydrogenated SBR, hydrogenated NBR, and the like may be listed up.

The acrylate polymer is a polymer including the monomer unit derived from acrylic acid ester and/or methacrylic acid ester. The amount of the monomer unit derived from acrylic acid ester and/or methacrylic acid ester in the acrylate polymer is usually 40% by weight or more, preferably 50% by weight or more, and further preferably 60% by weight or more. As specific examples of the acrylate polymer, cross-linked acrylate polymers such as copolymer of 2-ethylhexyl acrylate, methacrylic acid, acrylonitrile and ethyleneglycol dimethacrylate, copolymer of 2-ethylhexyl acrylate, methacrylic acid, methacrylonitrile and diethyleneglycol dimethacrylate, copolymer of 2-ethylhexyl acrylate, styrene, methacrylic acid and ethyleneglycol dimethacrylate, copolymer of butyl acrylate, acrylonitrile and diethyleneglycol dimethacrylate, and copolymer of butyl acrylate, acrylic acid and trimethylolpropane tri-methacrylate; copolymers of ethylene and acrylic (or methacrylic) acid ester such as copolymer of ethylene and methyl acrylate, copolymer of ethylene and methyl methacrylate, copolymer of ethylene and ethyl acrylate, arid copolymer of ethylene and ethyl methacrylate; and graft polymers where a radical polymerizable monomer is qrafted to the above copolymer of ethylene and acrylic (or methacrylic) acid ester. Note that, as the radical polymerizable monomer used for the above graft polymers, methyl methacrylate, acrylonitrile, methacrylic acid, and the like may be mentioned. In addition, copolymer of ethylene and acrylic (or methacrylic) acid such as copolymer of ethylene and acrylic acid, copolymer of ethylene and methacrylic acid and the like may be used as the dispersible binder.

Among these, the diene polymer and the cross-linked acrylate polymer are preferable, and the cross-linked acrylate polymer is in particular preferable, from the viewpoints that they can obtain an active material layer excellent in bonding property with a collector and surface smoothness, moreover, they enable to produce electrode for electrochemical elements with high electric capacity and low internal resistance.

Although the dispersible binder used for the present invention is not limited in particular as for the shape, it is preferable that the binder is particulate since its bonding property is good, and the decline of the electrostatic capacity of produced electrode and the deterioration thereof by the repetition of charge and discharge can be restrained. As the particulate dispersible binder, for example, one in the state where the particles of the dispersible binder are dispersed in the solvent like Latex, and powdered one obtained by drying such dispersed liquid may be employed.

Moreover, the dispersible binder used in the present invention may be particles which have a core-shell structure obtainable by stepwise-polymerizing two or more kinds of monomer mixtures. It is preferable that the dispersible binder which has the core-shell structure is obtained by first polymerizing the monomer that gives the first polymer to obtain a seed particle, and polymerizing the monomer that gives the second polymer in the presence of the seed particle.

Although the ratio of the core and the shell of the dispersible binder having the above core-shell structure is not limited in particular, the ratio of core portion: shell portion in mass is usually 50:50 to 99:1, preferably 60:40 to 99:1, and further preferably 70:30 to 99:1. The high molecular compound which makes up the core portion and the shell portion may be chosen from the above high molecular compounds. As for the core portion and the shell portion, it is preferable that one of these has a glass transition temperature below 0° C., and, the other has a glass transition temperature of 0° C. or higher. Moreover, the difference of the glass transition temperature of the core portion and the shell portion is usually 20° C. or higher, and preferably 50° C. or higher.

Although the average particle diameter of the particulate dispersible binder used in the present invention is not limited in particular, it is usually from 0.0001 to 100 μm, preferably from 0.001 to 10 μm, and further preferably from 0.01 to 1 μm. when the average particle diameter of the dispersible binder is in this range, it is possible to give excellent bonding force even by use of a small amount of dispersible binder to the active material layer. Herein, the average particle diameter is the number average particle diameter which is calculated as the arithmetic average value of measured diameters of 100 dispersible binder particles chosen at random by use of a transmission electron microscope photograph. The shape of particles may be either spherical or irregular.

The used amount of this dispersible binder to 100 parts by weight of the electrode active material is in the range of usually 0.1 to 50 parts by weight, preferably 0.5 to 20 parts by weight, and further preferably 1 to 10 parts by weight.

The soluble resin used for the composite particles is resin which dissolves in a solvent that can disperse the said dispersible binder, and further preferably has the function to assist the electrode active material, the electric conductive material, and the like to be dispersed uniformly in the solvent. The soluble resin may have or may not have bonding ability. The soluble resin is preferably resin that is dissolved in water, and specifically, cellulose polymers such as carboxymethyl cellulose, methyl cellulose, ethyl cellulose and hydroxypropyl cellulose, and ammonium salt or alkaline metal salt of these; salts of poly acrylic (or methacrylic) acid such as poly sodium acrylate (or methacrylate); polyvinyl alcohol, modified polyvinyl alcohol, polyethylene oxide; poly vinyl pyrrolidone, polycarboxylic acids, starch oxide, starch phosphate, casein, various denatured starches, a chitin, chitosan derivatives, and the like may be mentioned. These respective soluble resins may be used alone or may be used in combination of two or more. In particular, cellulose polymers are preferable, and carboxymethyl cellulose or its ammonium salt or alkaline metal salt are in particular preferable. Although the used amount of the soluble resin is not limited in particular, the used amount to 100 parts by weight of the electrode active material is in the range of usually 0.1 to 10 parts by weight, preferably 0.5 to 5 parts by weight, and further preferably 0.8 to 2 parts by weight. By using the soluble resin, sedimentation and condensation of the solid contents in slurry can be restrained. Moreover, since clogging of the atomizer at the moment of spray-drying can be prevented, it is possible to perform the spray-drying stably and continuously.

The composite particles used in the present invention may contain further other additives at necessity. As other additives, for example, there are surface active agents. As the surface active agents are mentioned anionic surface active agents, cationic surface active agents, nonionic surface active agents, and ampholytic surface active agents such as nonionic-anionic surface active agents, meanwhile, anionic or nonionic surface active agents that are easily thermally decomposed are especially preferable.

The used amount of the surface active agent is not limited in particulate, but the used amount thereof to 100 parts by weight of the electrode active material is in the range of 0 to 50 parts by weight, preferably 0.1 to 10 parts by weight, and further preferably 0.5 to 5 parts by weight.

The composite particle suitable for use in the present invention consist of an outer layer portion (outer shell portion) and an Inner layer portion (core portion), and each of the outer shell portion and the core portion are made by bonding the above electrode active material and the electric conductive material by the dispersible binder, and the weight average particle diameter of, the electrode active material and the electric conductive material which form the outer shell portion, is smaller than the weight average particle diameter of, the electrode active material and the electric conductive material which form the core portion. FIG. 1 is a figure schematically showing the cross sectional view of a composite particle 3 according to the present invention.

The outer shell portion of the composite particle is formed by bonding electrode active materials 12 and/or electric conductive materials 11 whose weight average particle diameter is comparatively small. Therefore, it is dense and has few unfilled potions.

On the other hand, the core portion of the composite particle is formed by bonding electrode active materials 12 and/or the electric conductive materials 11 whose weight average particle diameter is comparatively large. Since it is formed of the materials whose weight average particle diameter is comparatively large, and unfilled potions between electrode active materials and/or electric conductive materials are large. It can be easily determined by observing an electron microscopic picture of the cross section of the composite particle that the composite particle is structured of the outer shell portion and the core portion, and the weight average particle diameter of, the electrode active material and the electric conductive material which form the outer shell portion, is smaller than the weight average particle diameter of, the electrode active material and the electric conductive material which form the core portion.

As described above, when electric conductive materials smaller than the electrode active materials are used, many electric conductive materials are distributed in the composite particle outer shell portion, and many electrode active materials are distributed in composite particle core portion. When many electric conductive materials are distributed in the outer shell portion, the conductivity of the surface of the composite particle becomes high. It is thought that since composite particles contact together on the surface when the active material layer are formed, it becomes easy to pass along electricity, and resistance becomes low. Moreover, it is thought that since there are many unfilled potions which pass to many electrode active materials distributed in the core portion, the migrating of ion becomes well, therefore it is surmised that the capacitance becomes high.

The weight average particle diameter of the composite particles used in the present invention is in the range of usually 0.1 to 1000 μm, preferably 5 to 500 μm, and further preferably is 10 to 100 μm.

With regard to composite particles preferable in the present invention, particle diameter change ratio thereof when the composite particles are compressed to maximum load of 9.8 mN at a loading speed of 0.9 mN/sec with a micro compression testing machine is usually from 5 to 70%, and preferably from 20 to 50%. The particle diameter change ratio is the ratio ($=\Delta D/D_0 \times 100$) of the particle diameter decrease amount by compression ($\Delta D = D_0 - D_1$) to the particle diameter $D_0$ before compression. Herein, $D_1$ is a particle diameter which changes according to the load amount when a load is applied.

Moreover, with regard to the composite particles used preferably in the present invention, the change amount per a unit second of the particle diameter change ratio when the composite particles are compressed to maximum load of 9.8 mN at a loading speed of 0.9 mN/sec by a micro compression testing machine is preferably 25% or less, further preferably 10% or less, and in particular preferably 7% or less. The change amount per a unit second of the particle diameter change ratio is value that the particle diameter change ratio has been changed for one second during increasing load at a loading speed of 0.9 mN/sec. Particle diameter change ratio measured by the micro compression testing machine when the composite particles are compressed to the maximum load of 9.8 mN is the numerical value necessary to show the configuration retentivity of composite particles. If this particle diameter change ratio is too small, the shape of composite particles hardly change by pressure, and accordingly, the contact surface area of particles is small, and the conductivity does not become high. On the other hand, if the particle diameter change ratio is too large, the composite particles are crushed under pressure, and the network formed by tile electric conductive material and electrode active material in the composite particles are broken, and the conductivity declines.

Moreover, the change amount per a unit second of the particle diameter change ratio is one of indexes for judging the existence of breakage under pressure. If the breakage under pressure occurs, the particle diameter becomes small rapidly, and the change amount per a unit second of the particle diameter change ratio exceeds 25%. By the breakage under pressure, the network formed by the electric conduction material and electrode active material in the composite particles is broken, and the conductivity declines.

Since the composite particles whose particle diameter change ratio at the moment of compression to the maximum load of 9.8 mN is from 5 to 70% have moderate softness, the contact surface area of particles is large. And since they are not broken under pressure, the network of the electric conduction material and the electrode active material is maintained.

Although the producing method of the composite particles used in the present invention is not limited in particular, the following two producing methods described below are preferable, and the composite particles that are hardly broken under pressure may be easily obtained by these.

The first producing method comprises a step of obtaining slurry containing electric conductive materials, dispersible binder, and soluble resin and other additives to be added at necessity, a step of fluidizing the electrode active material and fluidized-bed granulating by spraying the above slurry thereto, and a step of rolling-fluidized granulating the particles obtained in the above fluidized-bed granulating step, and a step of heating them according to need.

First, slurry which comprises an electric conductive material, a dispersible binder, a soluble resin and other additives is obtained. As the solvent used in order to obtain the slurry in which the solvent can disperse the dispersible binder, water is used most preferably, meanwhile organic solvent may also be used. As the organic solvent, for example, alkyl alcohols such as methyl alcohol, ethyl alcohol, propyl alcohol; alkyl ketones such as acetone, methyl ethyl ketone; ether such as tetrahydrofuran, dioxiane, diglyme; amides such as diethyl formamide, dimethyl acetamide, N-methyl-2-pyrrolidone (hereinafter referred to as NMP), dimethyl imidazolidinone; sulfur-containing solvents such as dimethyl sulfoxide, sulfolane; may be mentioned. Of these, alcohols are preferable. If an organic solvent whose boiling point is lower than that of water is used in combination with water, the drying can be made fast at the time of fluidized-granulation. Moreover, since the dispersibility of the dispersible binder or the solubility of the soluble resin changes, and the viscosity and flowability of the slurry may be adjusted by the quantity or the type of the organic solvent, it is possible to improve the producing efficiency.

The amount of the solvent used in preparing the slurry is such that the solid content concentration of the slurry is usually in the range of 1 to 50% by weight, preferably 5 to 50% by weight, and further preferably 10 to 30% by weight. When the amount of solvent is in this range, the binder disperses uniformly, which is preferable.

The method or procedure to disperse or dissolve the above electric conductive material, the dispersible binder, and the soluble resin in the solvent is not limited in particular. For example, the method of adding the electric conductive material, the dispersible binder, and the soluble resin into the solvent to mix them; the method of dissolving the soluble resin in the solvent, and adding the dispersible binder (for example, Latex) dispersed in the solvent to mix them, and finally adding the electric conductive material to mix them; the method of adding the electric conductive material into the soluble resin dissolved in the solvent to mix them, and adding the dispersible binder dispersed in the solvent into them to mix them, and the like may be mentioned. As means for mixing, for example, mixer machines such as a ball mill, a sand mill, a bead mill, a pigment dispersion machine, a crushing machine, an ultrasonic distribution machine, a homogenizer, a planetary mixer may be mentioned. The mixing is usually performed in the range of room temperature to 80° C., and for 10 minutes to several hours.

Next, the electrode active material is fluidized, and the above slurry is sprayed thereto, and fluidized-granulation is performed. The fluidized-granulation method includes a method by a fluidized bed, a method by a modified fluidized bed, a method by a spouted bed, and the like. The method by a fluidized bed is one of fluidizing the electrode active material by a hot wind, and atomizing the above slurry to this from a spray and the like, to perform agglomeration granulation. The method by a modified fluidized bed is the same as the method by a fluidized bed, except that it is a method of giving a circulation flow to the powder in the bed, and of taking those granulated matters out which grow comparatively large by using the classifying effect.

Moreover, the method by a spouted bed is one of adhering the slurry from a spray and the like to coarse particles by use of the feature of a spouted bed to dry and granulate them simultaneously. As the process of the present invention, among these three methods, the method by a fluidized bed or the method by a modified fluidized bed are preferable.

Although the temperature of the slurry to be sprayed is usually at the room temperature, but it may be warmed to higher than the room temperature. The temperature of the hot wind used for fluidization is usually from 70 to 300° C., and preferably 80 to 200° C.

Although the particles obtained by the fluidized-granulation (hereinafter, referred to as "particles B") may be completely dried by a hot wind, meanwhile in order to increase the granulation efficiency in the following rolling-fluidized granulating process, particles in a wet condition are preferable.

Subsequently, the particles B obtained at the above fluidized-granulation process is granulated by rolling-fluidized granulation. The rolling-fluidized granulation method includes a rotary plate method, a rotary cylinder method, a rotary head cut cone method and the like. The rotary plate method is a method where the above slurry is sprayed to the particles B supplied in an inclined rotating plate to generate agglutinated granulated matters, and those granulated matters which grow comparatively large are taken out from a rim by use of the classifying effect of the rotary plate. The rotary cylinder method is a method where wet particles B are supplied to the inclined rotating cylinder, and rolled in the cylinder, and the above slurry is sprayed thereto to obtain agglutinated granulated matters. The rotary head cut cone method is same as the operation system of the rotary cylinder method, except that it is a method where those granulated matters which grow comparatively large are taken out by use of the classifying effect of the agglutinated granulated matters by the head cut cone.

Although the temperature at the time of rolling-fluidized granulation is not limited in particular, in order to remove the solvent which constitutes the slurry, the temperature is usually from 80 to 300° C., and preferably from 100 to 200° C. Furthermore, in order to harden the surface of the composite particles, heat treatment is performed. The temperature of the heat treatment is usually from 80 to 300° C.

By the above method, the composite particle comprising the electrode active material, the electric conductive material, the dispersible binder and the soluble resin is obtained. In the composite particle, the electrode active material and the electric conductive material are bonded by the dispersible binder, and the composite particle outer shell portion is formed by bonding the electrode active material and/or the electric conductive material whose weight average particle diameter is comparatively small, and the composite particle core portion is formed by bonding the electrode active material and/or the electric conductive material whose weight average particle diameter is comparatively large.

The second producing method includes a step of obtaining slurry containing the electrode active material, the electric conductive material, the dispersible binder, and the soluble resin, and a step of spray-drying the above slurry to spray-granulate it, and at necessity, a step of performing heat treatment.

First, the above electrode active material, the electric conductive material, the dispersible binder and soluble resin, and other additives at necessity are dispersed or dissolved in a solvent, and the slurry is obtained in which the above electrode active material, the electric conductive material, the binder and soluble resin, and other additives at necessity are dispersed or dissolved.

As the solvent used in order to obtain the slurry, those same as listed in the above first producing method may be mentioned. The amount of the solvent used in preparing the slurry is such that the solid content concentration of the slurry is in the range of usually 1 to 50% by weight, preferably 5 to 50% by weight, and further preferably 10 to 30% by weight.

The method or procedure to disperse or dissolve the above electrode active material, the electric conductive material, the dispersible binder, the soluble resin and other additives in the solvent is not limited in particular, but for example, the method of adding the electrode active material, the electric conductive material, the dispersible binder, and the soluble resin into the solvent to mix them; the method of dissolving the soluble resin in the solvent, adding the dispersible binder (for example, Latex) dispersed in the solvent to mix them, and finally adding the electrode active material and the electric conductive material to mix them; the method of adding the electrode active material and the electric conductive material to the dispersible binder dispersed in the solvent, and adding the soluble resin dissolved in the solvent to mix them, and the like may be mentioned. As means for mixing, for example, mixer machines such as a ball mill, a sand mill, a bead mill, a pigment dispersion machine, a crushing machine, an ultrasonic disperse machine, a homogenizer, a planetary mixer may be employed. The mixing is usually performed in the range of room temperature to 80° C., and for 10 minutes to several hours.

Next, the above slurry is granulated by the spray-drying method. The spray-drying method is the method of atomizing the slurry in a hot wind to dry it. The apparatus used for the spray-drying method is an atomizer. There are two types of atomizers, that is a rotary disk type and a pressurization type.

In the rotary disk type, the slurry is guided to the rough center of the rotating disk that rotates at a high speed, and the slurry is discharged to the outside of the disk by centrifugal force of the rotating disk, and at that moment, it is spray-dried. The rotation rate of the disk depends upon the size of the disk, meanwhile it is usually 5,000 to 30,000 rpm, and preferably 15,000 to 30,000 rpm. On the other hand, in the pressurization type, the slurry is pressurized and sprayed from a nozzle and dried.

Although the temperature of the slurry to be atomized is usually at the room temperature, but it may be warmed to higher than the room temperature. The hot wind temperature at the moment of spray-drying is usually from 80 to 250° C., and preferably from 100 to 200° C. In the spray-drying method, the method to blow a hot wind is not limited in particular, and for example, the method in which the hot wind and the direction of atomizing go in parallel in the transverse direction, the method in which atomizing is carried out in the drying column top part, and the atomized droplet falls with the hot wind, the method in which the atomized droplet and the hot wind contact in countercurrent, the method in which the atomized droplet first goes in parallel with the hot wind, subsequently falls by gravity, and then contact the hot wind in countercurrent, and the like may be employed.

Furthermore, in order to harden the surface of the composite particles, heat treatment is performed. The temperature of the heat treatment is usually from 80 to 300° C.

By the above producing method, the composite particle containing the electrode active material, the electric conductive material, the dispersible binder, and the soluble resin is obtained. In this composite particle, the electrode active material and the electric conductive material are bonded by the dispersible binder, and the composite particle outer shell portion is formed by bonding the electrode active material and/or the electric conductive material whose weight average particle diameter is comparatively small, and the composite particle core portion is formed by bonding the electrode active material and/or the electric conductive material whose weight average particle diameter is comparatively large.

The electrochemical element electrode according to the present invention is made by forming the active material layer where the above composite particles are bonded together on a collector. Herein, "active material layer where the above composite particles are bonded together" means that at least part of the composite particles are bonded with one another and form the active material layer while the particle shape is maintained. The fact that the composite particles maintain their particle shape in the active material layer can be easily confirmed by observing an electron microscopic picture of the cross section of the composite particle. FIG. 3 is a conceptual figure of the active material layer of the electrode according to the present invention, and shows that the composite particles 3 are not broken under pressure, but they maintain their shape as it is in the active material layer 2. FIG. 7 is a figure showing an electron microscopic picture of the cross section of the electrode obtained in the EXAMPLE according to the present invention.

The composite particles are bonded together by thereselves or by use of other dispersible binder and other additives at necessity. The amount of the composite particles contained in the active material layer is usually 50% by weight or more, preferably 70% by weight or more, and further preferably 90% by weight or more.

As the other dispersible binder to be contained if needed, those same as ones listed up as the dispersible binder used in obtaining the above composite particle may be mentioned. Since the above composite particle has already contained the dispersible binder, in forming the active material layer, it is not necessary to add the dispersible binder separately, but in order to increase the bonding force of the composite particles, other dispersible binder may be added before the active material layer is formed. The amount of other dispersible binder to be added before the active material layer is formed, in the sum total with the dispersible binder in the composite particles, and to 100 parts by weight of the electrode active material, is in the range of usually 0.1 to 50 parts by weight, preferably 0.5 to 20 parts by weight, and further preferably 1 to 10 parts by weight.

The other additives include forming auxiliary agents such as water and alcohol and the like, and the quantity which does not spoil the effect of the present invention may be chosen appropriately and may be applied.

As the material of the collector used in the present invention, for example, metal, carbon, conductive polymer, and the like maybe used, and metal is used preferably. As the metal for the collector, aluminum, platinum, nickel, tantalum, titanium, stainless steel, and other alloy and the like are usually used. Among these, it is preferable to use aluminum or aluminum alloy from the viewpoint of conductivity and voltage resistance. Moreover, when high voltage resistance is required, the high purity aluminum disclosed in Japanese Unexamined Patent Application Publication No. 2001-176757 and the like may be used preferably. The collector is a film or a sheet, and although the thickness thereof is suitably chosen according to applications, it is usually from 1 to 200 µm, preferably from 5 to 100 µm, more preferably from 10 to 50 µm.

Although the active material layer may be fabricated by forming the material comprising the composite particles for electrochemical element electrodes (hereinafter, referred to as electrochemical element electrode material) into the shape of a sheet, and laminating the sheet subsequently onto the collector, meanwhile, it is preferable to fabricate the electrochemical element electrode material directly on the collector to form the active material layer. As the method of forming the active material layer which comprises the electrochemical element electrode material, although there are the dry-molding methods such as a pressure molding method, and the wet-molding methods such as an application method, the dry-molding methods are preferable since the drying process is unnecessary and the producing cost can be reduced. As the dry molding method, there are the pressure molding method, the extrusion molding method (referred to also as paste extrusion) and the like. The pressure molding method is the method where pressure is given to the electrochemical element electrode material, and thereby the material is made ultrafine by the re-arrangement, modification, and destruction of the electrode material to form the active material layer. The extrusion molding method is the method where the electrochemical element electrode material is extruded by an extrusion molding machine into a film shape, a sheet shape and the like, and is the method that can continuously form the active material layer as a long object. Among these, it is preferable to use the pressure molding method since it can be made by simple equipment.

As the pressure molding method, for example, as shown in FIG. 2, there are the method where the electrode material containing composite particles 3 are supplied to a roll type pressure molding apparatus by a feeder such as a screw feeder 4 to form the active material layer (in this method, the active material layer can be directly laminated on the collector by sending the collector 1 into the roll 5 at the same time when the electrode material is supplied), and the method where the electrode material is spread on the collector, and the electrode material is leveled by a blade or the like, and its thickness is adjusted, then it is formed by a pressure molding apparatus, the method where the electrode material is filled up in cavity of mold and the mold is pressurized and formation is made, and so on. Among these dry-molding methods, the roll pressure molding method is preferable. The temperature at the moment of formation is usually from 0 to 200° C., and it is preferable that the temperature is higher than the melting point or the glass transition temperature of the binder, and further preferable that the temperature is higher by 20° C. or more than the melting point or the glass transition temperature of the binder. In the roll pressure molding method, the molding rate is usually from 0.1 to 20 m/min, and further preferably from 1 to 10 m/min. Moreover, the press line pressure (a linear pressure) between rolls is usually from 0.2 to 30 kN/cm, and preferably from 0.5 to 10 kN/cm.

In order to eliminate uneven thickness of the formed electrode, and to increase the density of the active material layer and to achieve high capacitance, post-pressing may be performed further if needed. As the method of post-pressing, press process by a roll is generally performed. In the roll press process, two cylindrical rolls are arranged vertically in parallel with each other with a narrow opening, and they are rotated in opposite directions, and an electrode is inserted into them to be pressurized. The temperature of the roll may be adjusted by heating or cooling.

EXAMPLES

The present invention is explained still more specifically with reference to EXAMPLEs and COMPARATIVE EXAMPLEs hereafter, however, the present invention is not limited to the following EXAMPLESs. Moreover, part and % are by weight, unless otherwise specified.

Example 1

100 parts of electrode active material (activated carbon having specific surface area of 2000 $m^2/g$ and weight average particle diameter of 5 µm), 5 parts of electric conductive material (acetylene black "Denka Black Powder": manufactured by Denki Kagaku Kogyo K.K.), 7.5 parts of dispersible binder (40% aqueous dispersion of cross-linked acrylate polymer with average particle diameter of 0.15 µm and glass transition temperature of −40° C.:"AD211": manufactured by Zeon Corporation), 93.3 parts of soluble resin (1.5% solution of carboxymethyl cellulose "DN-800H": manufactured by Daicel Chemical Industries, Ltd.), and 341.3 parts of ion exchanged water were stirred and mixed by a TK homomixer to obtain slurry having solid content of 20%. Subsequently, the slurry was charged into a hopper 51 of a spray drier (with a pin type atomizer manufactured by Ohkawara Kakohki Co. Ltd.) as shown in FIG. 9, and sent to the column top nozzle 57 by the pump 52, and sprayed from the nozzle into the drying column 58. At the same time, 150° C. hot wind was sent into the drying column 58 from the side of the nozzle 57 through the heat exchanger 55, to give spherical particle having average particle diameter of 50 µm. This particle was further heated at 150° C. for 4 hours to obtain composite particle (A-1). The weight average particle diameter of the composite particle (A-1) was measured by use of a powder measurement apparatus (Powder Tester PT-R: manufactured by Hosokawa Micron Corp.). The composite particle A-1 consisted of a core portion and an outer shell portion, and in the core portion, the shapes of particles having large particle diameter can be confirmed, meanwhile, in the outer shell portion, fine particles whose individual shape cannot be confirmed partially are bonded together. That is, the weight average particle diameter of, the electrode active material and the electric conductive material which form the outer shell portion, was smaller than the weight average particle diameter of, the electrode active material and the electric conductive material which form the core portion (refer to FIG. 5 and FIG. 6).

The composite particle A-1 was compressed by use of a micro compression testing machine (manufactured by Shimadzu Ltd.: MCT-W) at maximum load of 9.8 mN and load speed of 0.9 mN/sec. The particle diameter change ratio, and the change amount per a unit second of the particle diameter change ratio, were 22%, 8% respectively. The obtained composite particle, as shown in FIG. 2, was supplied between the rolls (roll temperature 100° C., press line pressure which is a linear pressure was 3.9 kN/cm) of a roll pressing machine (pushing cut rough surface heat roll; manufactured by Hirano Engineering Research Institute Ltd.) and was formed on an aluminum collector having thickness of 40 μm at molding rate 3.0 m/min into a sheet shape, which allowed to give an electrode sheet having thickness of 350 μm, width of 10 cm, and density of 0.58 g/cm$^3$. The capacitor characteristics of this electrode sheet are shown in Table 1. Moreover, FIG. 7 is a figure showing the image of the fracture surface of this electrode observed by the electron microscope. The active material layer had a structure where the composite particles were bonded together while the structure thereof was maintained.

Example 2

Slurry was obtained in the same manner as in the EXAMPLE 1 except that 5.6 parts of polytetrafluoroethylene was used in the place of the binder (AD-211) used in the EXAMPLE 1, and by use of this slurry, a spherical composite particle A-2 of particle diameter 5 to 70 μm (average particle diameter 50 μm) was obtained. The composite particle A-2 consisted of a core portion and an outer shell portion in the same manner as the composite particle A-1, and the weight average particle diameter of, the electrode active material and the electric conductive which form the outer shell portion, was smaller than the weight average particle diameter of, the electrode active material and the electric conductive material which form the core portion, and had the same structure as that of the composite particles A-1.

The obtained composite particle is rolled and formed by use of the roll pressing machine in the same manner in EXAMPLE 1, and an electrode sheet having thickness of 380 μm, width of 10 cm, and density of 0.59 g/cm$^3$ was obtained. The capacitor characteristics of this electrode sheet are shown in Table 1. Further, in the same manner as in the EXAMPLE 1, the active material layer had a structure where the composite particles were bonded together while the structure thereof was maintained.

Example 3

Slurry S1 (solid content 8%) made of 2 parts of an electric conductive material (Denka Black Powder: manufactured by Denki Kagaku Kogyo K.K.), 7.5 parts (solid content 40%) of a binder (AD211: manufactured by Zeon Corporation), 3.33 parts (solid content 4%) of carboxymethyl cellulose ("DN-10L" manufactured by Daicel Chemical Industries, Ltd.), 17.76 parts (solid content 1.5%) of carboxymethyl cellulose ("DN-800H" manufactured by Daicel Chemical. Industries, Ltd.), and 36.9 parts of ion exchanged water was prepared.

100 parts of an electrode active material (activated carbon having specific surface area of 2000 m$^2$/g and weight average particle diameter of 5 μm) was charged into an Agglomaster manufactured by Hosokawa Micron Corp., and it was fluidized by 80° C. hot wind, and the above slurry S1 was atomized into the Agglomaster, and fluidized-bed granulation was performed to obtain a particle B. The average particle diameter of the particle B was 40 μm.

Slurry S2 (solid content 10.9%) made of 3 parts of an electric conductive material (Denka Black Powder: manufactured by Denki Kagaku Kogyo K.K.), 0.625 parts (solid content 40%) of a binder (AD211: manufactured by Zeon Corporation), 5.0 parts (solid content 4%) of carboxymethyl cellulose ("DN-10L" manufactured by Daicel Chemical Industries, Ltd.), and 26.64 parts (solid content 1.5%) of carboxymethyl cellulose ("DN-800H" manufactured by Daicel Chemical Industries, Ltd.) was prepared.

The particles B were charged into a rolling-fluidized granulating machine (Henschel Mixer), and it was rolling-fluidized granulated while the slurry S2 was atomized to obtain a particle. This particle was further heated at 150° C. for 4 hours to give composite particle A-3. This composite particle was spherical and its average particle diameter was 50 μm. The composite particle A-3 consisted of a core portion and an outer shell portion, and the weight average particle diameter of, the electrode active material and the electric conductive material which form the outer shell portion, was smaller than the weight average particle diameter of, the electrode active material and the electric conductive material which form the core portion. The change ratio at 9.8 mN by the micro compression tester was 36%.

The obtained composite particle A-3 was rolled and formed by use of the roll pressing machine in the same manner in the EXAMPLE 1, and an electrode sheet having thickness of 350 μm, width of 10 cm, and density of 0.57 g/cm$^3$ was obtained. The capacitor characteristics of this electrode sheet were shown in Table 1. Further, in the same manner as in the EXAMPLE 1, the active material layer had a structure where the composite particles were bonded together while the structure thereof was maintained.

TABLE 1

| | Particle diameter change ratio [%] | Change amount per a unit second of the particle diameter change ratio [%] | Electrode density [g/cm$^3$] | Active material layer thickness [μm] | Capacitance [F/g] | Internal resistance [Ω] |
|---|---|---|---|---|---|---|
| EX. 1 | 22 | 8 | 0.58 | 350 | 54.6 | 12.2 |
| EX. 2 | 44 | 10 | 0.59 | 380 | 53.4 | 11.9 |
| EX. 3 | 36 | 7 | 0.57 | 350 | 54.5 | 9.8 |
| EX. 4 | 40 | 11 | 0.59 | 350 | 53.0 | 12.8 |
| Comp. EX. 1 | 81 | 86 | 0.58 | 300 | 45.5 | 15.0 |
| Comp. EX. 2 | 80 | 40 | 0.59 | 320 | 46.2 | 13.2 |

Example 4

A composite particle A-4 was obtained in the same manner as in the EXAMPLE 1 except that the amount of the dispersible binder was changed into 14 parts. The composite particle A-4 consisted of a core portion and an outer shell portion, and the weight average particle diameter of, the electrode active material and the electric conductive material which form the outer shell portion, was smaller than the weight average particle diameter of, the electrode active material and the electric conductive material which form the core portion. The composite particle A-4 was rolled and formed by use of the roll pressing machine in the same manner in the EXAMPLE 1, and an electrode having thickness of 350 μm, width of 10 cm, and density of 0.59 g/cm$^3$ was obtained. The capacitor characteristics of this electrode sheet were shown in Table 1. Further, in the same manner as in the EXAMPLE 1, the active material layer had a structure where the composite particles were bonded together while the structure thereof was maintained.

Comparative Example 1

A composite particle B-1 was obtained in the same manner as in the EXAMPLE 1 except that the amount of the dispersible binder was changed into 3.75 parts.

The composite particle B-1 was rolled and formed by use of the roll pressing machine in the same manner in the EXAMPLE 1, and an electrode sheet having thickness of 300 μm, width of 10 cm, and density of 0.58 g/cm$^3$ was obtained. The capacitor characteristics of this electrode sheet were shown in Table 1. Further, FIG. 8 is a figure showing the image of the fracture surface of this electrode observed by the electron microscope. In the active material layer, composite particles were broken under pressure, and the electrode active material and the electric conductive material were distributed piecemeal.

Comparative Example 2

The particles B obtained in the intermediate step of the EXAMPLE 3 were particles of a structure where only the electric conductive material adheres to the surroundings of the electrode active material, and was not of a two-layer structure of a core portion and an outer shell portion. By use of this particle B, roll formation was carried out in the same manner as the EXAMPLE 1 except that the press line pressure (a linear pressure) of the roll was changed into 9.8 kN/cm, and the molding rate was changed into 0.5 m/min, and an electrode sheet which had an active material layer with thickness of 320 μm, width of 10 cm, and density of 0.59 g/cm$^3$ is obtained. The capacitor characteristics of this electrode sheet were shown in Table 1. In the active material layer, composite particles were broken under pressure, and the electrode active material and the electric conductive material were distributed piecemeal.

Evaluation Method of Capacitor Characteristics (Electrode Density)

An electrode of a size 40 mm×60 mm was cut down from the electrode sheet, the weight and volume of the electrode were measured, and the electrode density excluding the collector portion was calculated.

(Capacity and Internal Resistance)

The electrode sheet was punched out to obtain two circular electrodes with diameter 12 mm. The active material layer of the electrodes were opposed each other, and a rayon separator of thickness 35 μm was inserted thereinto. To this, electrolysis solution in which triethylmonomethylammonium tetrafluoroborate was dissolved into propylene carbonate at concentration of 1.5 mol/L was impregnated under decompression, to give a coin cell CR2032 type electric double layer capacitor.

The obtained electric double layer capacitor was used, and it was charged at 25° C. for 10 minutes at constant current 10 mA from 0V to 2.7V, and then to 0V, it was discharged at fixed current 10 mA. From the obtained charge-discharge curve, capacitance was calculated, and it was divided by the mass of only the active material layer of the above electrode to give the capacitance per unit mass of the active material layer. Moreover, the internal resistance was calculated from the charge-discharge curve according to the calculation method of the standard RC-2377 specified by the Japan Electronics and Information Technology Industries Association.

As is apparent from the above EXAMPLEs and COMPARATIVE EXAMPLEs, an electrochemical element electrode where active material layer structured by bonding composite particles together is formed on a collector, wherein each of the composite particles comprises an electrode active material, an electric conductive material, a dispersible binder and a soluble resin, in which the electrode active material and the electric conductive material are bonded by the dispersible binder has high and uniform electrode density. And in the electric double layer capacitor using this electrode, the internal resistance becomes low, and the electric capacitance becomes large.

On the other hand, it is known that in electrodes having a structure where composite particles are broken under pressure, and the electrode active material and the electric conductive material are distributed piecemeal, the internal resistance does not become low, and the capacitance is low.

INDUSTRIAL APPLICABILITY

As explained heretofore, by use of the electrochemical element electrode according to the present invention, since it is possible to produce an electrochemical element having low internal resistance and high electric capacitance, the present invention is used preferably for various applications including backup power sources of memories in personal computers and personal digital assistants, power sources for instantaneous power failure measures in personal computers and the like, applications to electric cars or hybrid cars, solar power generation energy storage systems used together with solar cells, load leveling power sources combined with batteries and the like.

The invention claimed is:

1. An electrochemical element electrode which is made by forming an active material layer on a collector,
    wherein the active material layer is made by bonding composite particles together,
    each of the composite particles comprises an electrode active material, an electric conductive material, a dispersible binder and a soluble resin, and
    in which the electrode active material and the electric conductive material are bonded by the dispersible binder,
    wherein each of the composite particles comprises an outer shell portion and a core portion,
    the outer shell portion and the core portion are made by bonding the electrode active material and the electric conductive material by the dispersible binder, and
    the weight average particle diameter of the electrode active material and the electric conductive material which form the outer shell portion is smaller than the weight average particle diameter of the electrode active material and the electric conductive material which form the core portion.

2. The electrochemical element electrode according to claim 1, wherein the composite particles have weight average particle diameter from 0.1 μm to 1000 μm, and have particle diameter change ratio from 5% to 70% when the composite particles are compressed to maximum load of 9.8 mN at a loading speed of 0.9 mN/sec with a micro compression testing machine.

3. The electrochemical element electrode according to claim 1, wherein the dispersible binder has water dispersibility.

4. The electrochemical element electrode according to claim 1, wherein the electrode active material is an activated carbon having a specific surface area of 30 m$^2$/g or more.

5. The electrochemical element electrode according to claim 1, wherein the dispersible binder is acrylate polymer.

6. The electrochemical element electrode according to claim 1, wherein the dispersible binder is polytetrafluoroethylene.

7. The electrochemical element electrode according to claim 1, wherein the amount of the soluble resin to 100 parts by weight of the electrode active material is from 0.1 to 10 parts by weight.

8. The electrochemical element electrode according to claim 1, wherein the active material layer is made by dry-molding composite particles, which comprise the electrode active material, the electric conductive material, the dispersible binder and the soluble resin, and in which the electrode active material and the electric conductive material are bonded by the dispersible binder.

9. The electrochemical element electrode according to claim 8, wherein the dry-molding is roll pressure molding.

10. The electrochemical element electrode according to claim 9, wherein the molding rate is from 0.1 to 20 m/min.

11. The electrochemical element electrode according to claim 9, wherein the press line pressure is a linear pressure and is from 0.2 to 30 kN/cm.

12. An electric double layer capacitor equipped with the electrochemical element electrode according to claim 1.

13. A secondary battery equipped with the electrochemical element electrode according to claim 1.

* * * * *